(12) United States Patent
Basham et al.

(10) Patent No.: US 6,636,778 B2
(45) Date of Patent: Oct. 21, 2003

(54) ALLOCATION OF DATA STORAGE DRIVES OF AN AUTOMATED DATA STORAGE LIBRARY

(75) Inventors: Robert Beverley Basham, Aloha, OR (US); Kirby Grant Dahman, Tucson, AZ (US); Kenneth Fairclough Day, III, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 09/948,627

(22) Filed: Sep. 10, 2001

(65) Prior Publication Data

US 2003/0050729 A1 Mar. 13, 2003

(51) Int. Cl.[7] .................................................. G06F 7/00
(52) U.S. Cl. ....................... 700/214; 700/225; 711/112; 360/98.01; 369/30.06; 369/30.28; 369/178.01
(58) Field of Search .................... 700/213, 214, 700/225; 711/112, 6; 369/30.06, 30.28, 178.01; 360/98.01

(56) References Cited

U.S. PATENT DOCUMENTS

| | | | | |
|---|---|---|---|---|
| 5,197,055 A | * | 3/1993 | Hartung et al. | 369/30.32 |
| 5,469,560 A | * | 11/1995 | Beglin | 711/112 |
| 5,513,156 A | | 4/1996 | Hanaoka et al. | 369/34 |
| 5,805,864 A | * | 9/1998 | Carlson et al. | 703/24 |
| 5,970,030 A | * | 10/1999 | Dimitri et al. | 369/30.46 |
| 6,052,341 A | * | 4/2000 | Bingham et al. | 711/112 |
| 6,067,481 A | * | 5/2000 | Saliba et al. | 700/214 |
| 6,092,169 A | * | 7/2000 | Murthy et al. | 711/170 |
| 6,154,787 A | * | 11/2000 | Urevig et al. | 710/8 |
| 6,286,079 B1 | * | 9/2001 | Basham et al. | 711/112 |
| 6,336,173 B1 | * | 1/2002 | Day et al. | 711/161 |
| 6,473,829 B1 | * | 10/2002 | Dahman et al. | 711/112 |
| 6,519,678 B1 | * | 2/2003 | Basham et al. | 711/112 |

* cited by examiner

*Primary Examiner*—Khoi H. Tran
(74) *Attorney, Agent, or Firm*—John H. Holcombe

(57) ABSTRACT

Data storage drives of an automated data storage library are allocated to received requests. A drive resource provider, upon receiving a request for a drive when all of the drives of the pool are allocated, holds any mount of a portable data storage cartridge relative to the request, releasing the hold when a drive is allocated. Spare drives are provided, outside of the pool. A spare drive may be allocated in response to the request, and a message is posted indicating use of the spare data storage drive. The posted message may comprise a notification that action may be taken to permanently transfer a spare data storage drive to the pool.

48 Claims, 11 Drawing Sheets

FIG. 5A

VIRTUAL LIBRARY 0 DRIVE IMAGE TABLE

70 →

| VIRTUAL DRIVE | | ALLOCATED DRIVE OF POOL | |
|---|---|---|---|
| ID | CHARACTERISTICS | ID | CHARACTERISTICS |
| AA | ~ | DR3 | ~ |
| AB | ~ | * | |
| BB | ~ | W | |
| BD | ~ | DR8 | ~ |
| DE | ~ | DR4 | |
| DA | ~ | * | |
| DF | ~ | * | |
| ↑75 | ↑76 | ↑77 | ↑78 |

FIG. 5B

VIRTUAL LIBRARY 1 DRIVE IMAGE TABLE

71 →

| VIRTUAL DRIVE | | ALLOCATED DRIVE OF POOL | |
|---|---|---|---|
| ID | CHARACTERISTICS | ID | CHARACTERISTICS |
| BF | ~ | * | |
| CA | ~ | DR5 | ~ |
| CC | ~ | * | |
| CF | ~ | * | |
| EA | ~ | DR0 | ~ |
| EE | ~ | DR1 | ~ |
| EF | ~ | * | |
| FA | ~ | * | |
| ↑75 | ↑76 | ↑77 | ↑78 |

FIG. 6

DRIVE TABLE

| PHYSICAL DRIVE | | ALLOCATION |
|---|---|---|
| ID | CHARACTERISTICS | |
| DR0 | ~~~ | VL1/VD EA |
| DR1 | ~~~ | VL1/VD EE(1) |
| DR2 | ~~~ | FREED |
| DR3 | ~~~ | VL0/VD AA |
| DR4 | ~~~ | VL0/VD DE |
| DR5 | ~~~ | VL1/VD CA |
| DR6 | ~~~ | FREED |
| DR7 | ~~~ | SPARE |
| DR8 | ~~~ | VL0/VD BD |
| DR9 | ~~~ | VL0/VD DF |

LIBRARY IMAGE TABLES

| VIRTUAL LIBRARY | | | | PHYSICAL LIBRARY | |
|---|---|---|---|---|---|
| ID | VIRTUAL DRIVES | PRIORITY | SPARE AUTH | PHYSICAL DRIVES | STORAGE SHELVES |
| 0 | AA<br>AB<br>BB<br>BD<br>DA<br>DE<br>DF | 0 | Y | DR0<br>DR2<br>DR3<br>DR4<br>DR5<br>DR6<br>DR8<br>DR9 | 0100<br>TO<br>11FF |
| 1 | BF<br>CA<br>CC<br>CF<br>EA<br>EE<br>EF<br>FA | 1 | Y | DR0<br>DR1<br>DR3<br>DR4<br>DR5<br>DR6<br>DR8 | 1200<br>TO<br>1FFF |

85 ↙

↑90 ↑87 ↑88 ↑89 ↑97 ↑91

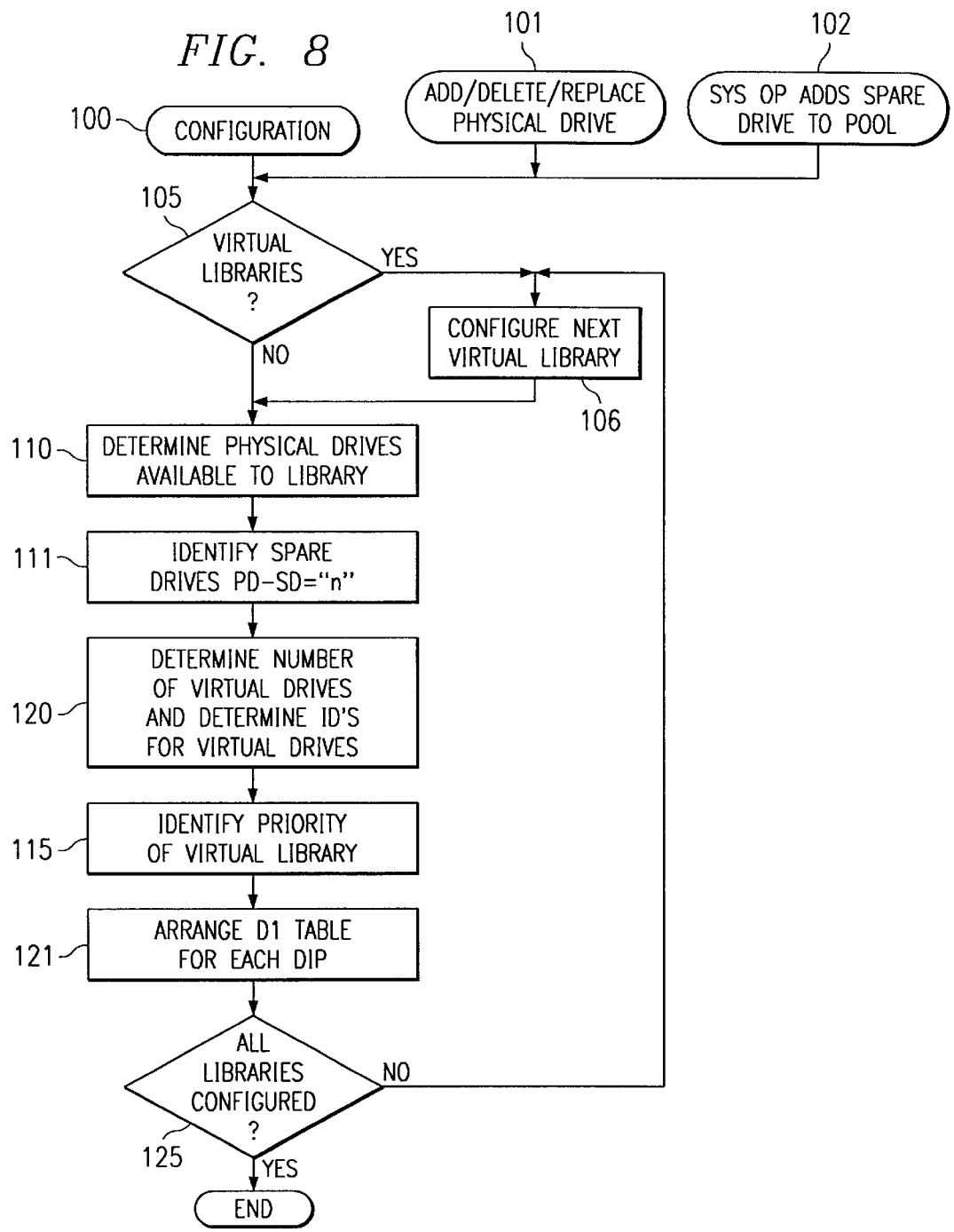

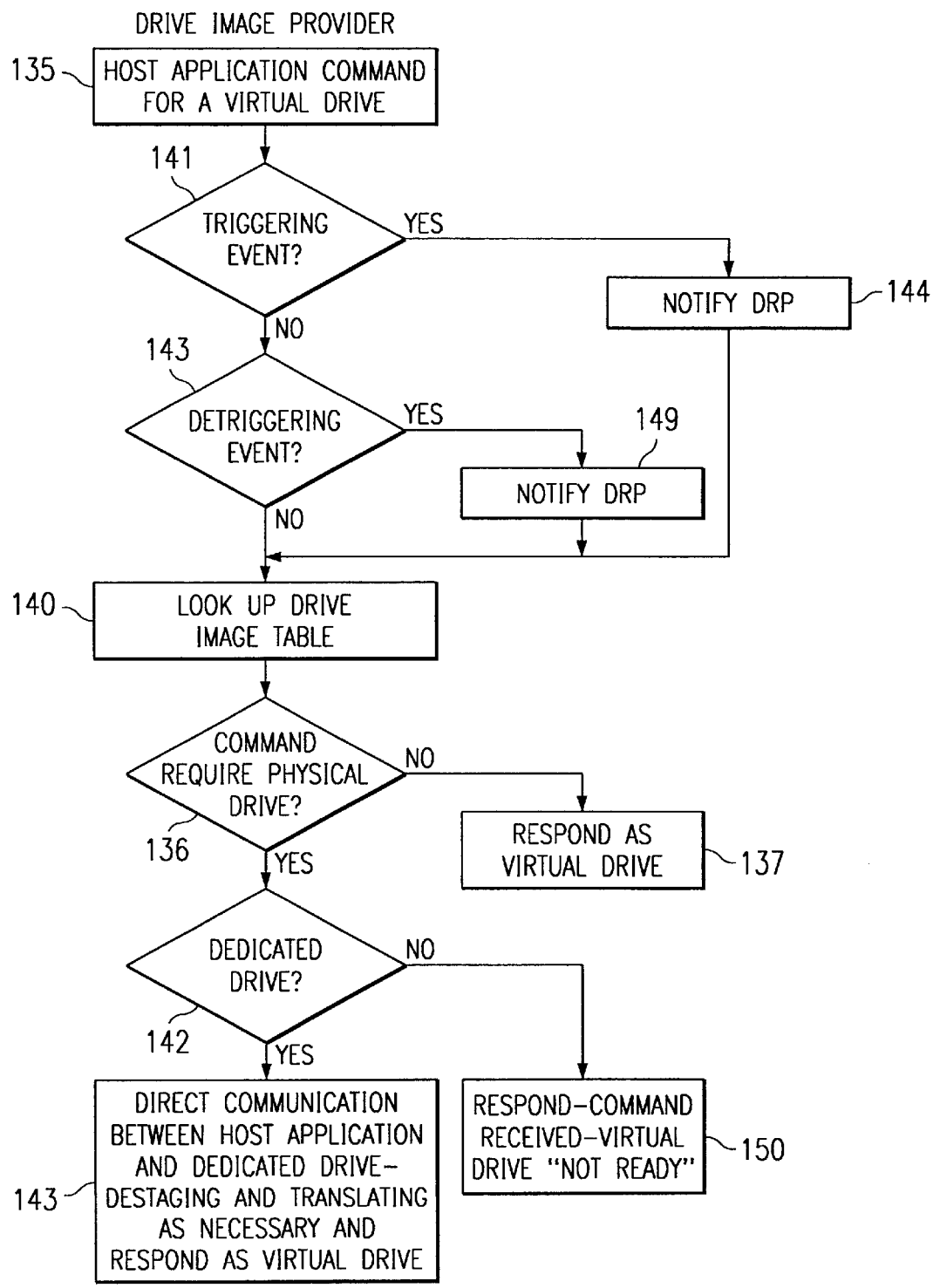

DRIVE RESOURCE PROVIDER

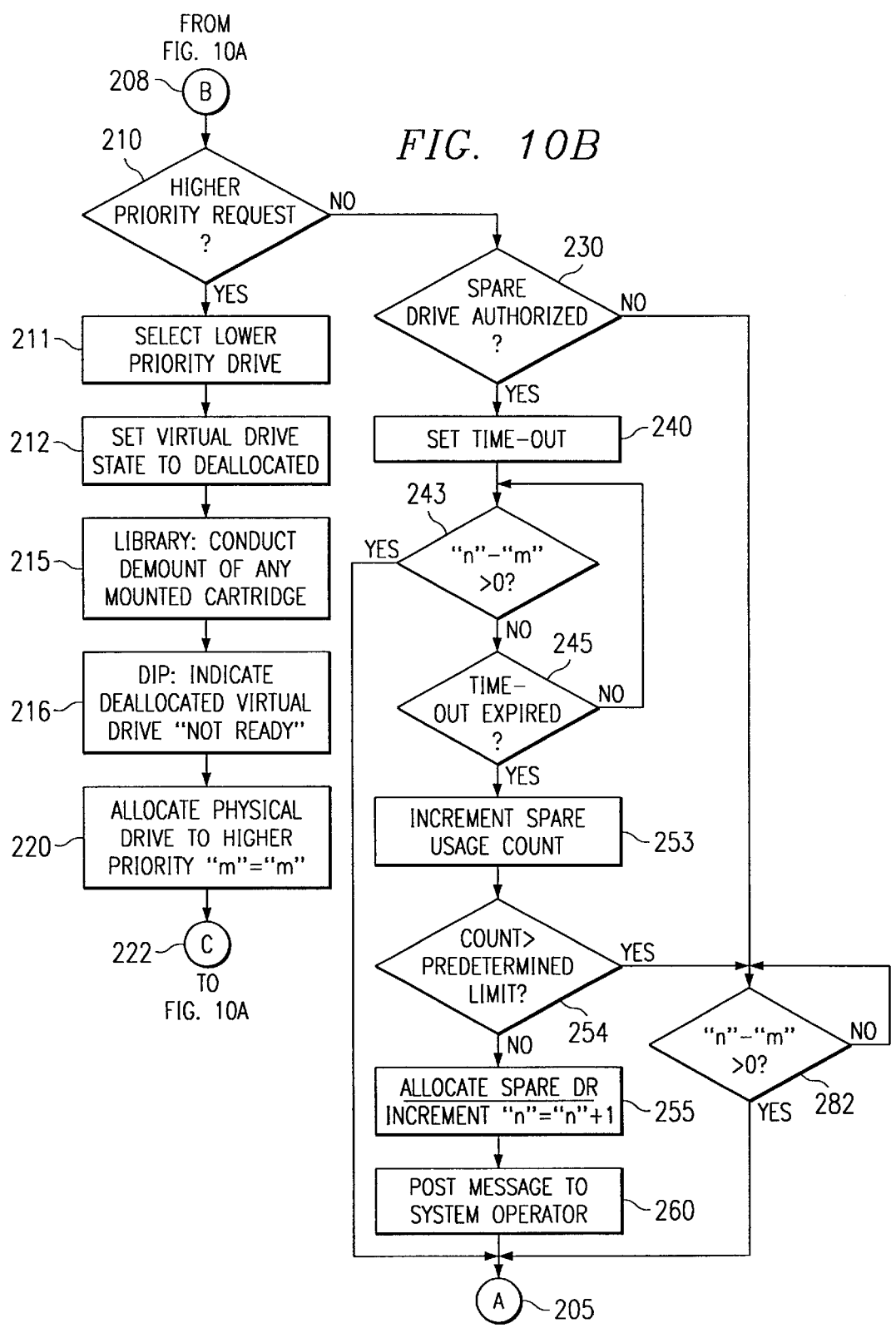

DRIVE RESOURCE PROVIDER

ALLOCATION OF DATA STORAGE DRIVES OF AN AUTOMATED DATA STORAGE LIBRARY

CROSS REFERENCE TO RELATED APPLICATION

Copending and coassigned U.S. Pat. No. 6,519,678 filed on even date herewith relates to virtualization of data storage drives of an automated data storage library with respect to host applications which communicate with the library.

FIELD OF THE INVENTION

This invention relates to data storage drives of an automated data storage library which stores portable data storage cartridges in storage shelves and transports the portable data storage cartridges between the storage shelves and the data storage drives for mounting and demounting the portable data storage cartridges at the data storage drives, and, more particularly, to the allocation of those data storage drives.

BACKGROUND OF THE INVENTION

Automated data storage libraries are increasingly employed for storage of large quantities of data, typically data that is infrequently accessed by the host applications. The data is stored on portable data storage cartridges which are stored in storage shelves. Examples of portable data storage cartridges are cartridges containing a length of magnetic tape or containing an optical disk.

When the data is accessed by the library, an accessor robot operated by a robot control of the library, grips the desired portable data storage cartridge from the storage shelf at which it is stored and transports the portable data-storage cartridge between the storage shelves and data storage drives for mounting and demounting the portable data storage cartridges at the data storage drives, and returning the portable data storage cartridge to the same or a different storage shelf.

Automated data storage libraries are sometimes arranged so that, even in the presence of multiple host applications, the library and its data storage drives appear to each host application as its own library and drives. In one example, a specific set of storage shelves and at least one data storage drive of the library is dedicated to each host application. Upon a request for data from the host application, the portable data storage cartridge having the requesting data is accessed by the accessor robot of the library, and delivered to a data storage drive dedicated to the host application for use by the host application. The host application can thus conduct a series of mounts on a known drive. This is very efficient from the standpoint of the host, since its drive is always available, and the drive addressing is direct and immediate. The library may also appear to be directly assigned to the host application, but the accessor robot is actually shared. It is less efficient from the standpoint of the drive usage in that, if each of the host applications is not constantly using its dedicated data storage drive(s), the drives are often idle. Since the drives are assigned to different host applications, any host application that is particularly active is unable to "borrow" drives from another host application, and, for example, if all of the assigned drives are utilized and data on a different cartridge is needed, the host application may have to wait until the host application itself demounts one cartridge or releases its drive in order to access data on the other cartridge. Any "borrowing" of a drive from another host application would require reconfiguring at least the device drivers for both host applications. Should a host application grow in its needs, new drives cannot be assigned to that host application without reconfiguring at least the host application.

In another example, the host applications are not allowed direct communication with a data storage drive. Rather, a "virtual" library is established which employs cache storage (typically disk drives) to store data received from host applications, acting as though the cache storage is a data storage drive and is writing the data to portable data storage cartridge. The data may be reaccessed while in the cache, called a "cache hit". If not reaccessed, the library downloads the data from the cache storage to a cartridge employing a data storage drive selected by the library. When data is requested by the host application, and it is not in cache, called a "cache miss", the library employs a table to find the cartridge storing the data, operates the accessor robot to access the cartridge, finds an available data storage drive, operates the accessor robot to mount the cartridge on the drive, reads the data from the cartridge and uploads the data to cache. From the standpoint of the library, the usage of the library components is efficient. However, cache storage is expensive and adds cost and complexity. The cache storage must be sufficiently large to handle large data sets and must have good staging and destaging algorithms to avoid excessive "cache miss" situations. The host applications communicate with the cache rather than directly with a drive, and any host application can contend for use of shared components, leading to less predictable performance.

SUMMARY OF THE INVENTION

An object of the present invention is to provide an automated data storage library system which employs shared components in an efficient manner.

Another object of the present invention is to allow expanding host applications or the library to receive the benefit of additional drives without requiring reconfiguration of the host applications or the library.

An allocation system and computer implemented method are provided for allocating physical data storage drives of an automated data storage library. The library stores a plurality of portable data storage cartridges in storage shelves, and an accessor robot transports the portable data storage cartridges between the storage shelves and the data storage drives for mounting and demounting the portable data storage cartridges at the data storage drives.

The allocation system comprises a drive resource provider coupled to, or of, the library, responsive to the requests for data storage drives, e.g., from host application(s). The drive resource provider assigns a plurality of the library physical data storage drives to a pool, and allocates and deallocates the data storage drives from the pool for the benefit of the host applications, in accordance with the copending '00038-US1 application.

In accordance with the present invention, the drive resource provider, upon receiving a request for a data storage drive when all of the data storage drives of the pool are allocated, indicates to the library to hold any mount of a portable data storage cartridge relative to the request. Additionally, a drive image provider, upon receiving the request when all of the drives are allocated, provides an indication that the requested drive is currently unavailable to complete any subsequent command requiring a mounted portable data storage cartridge. As discussed in the copending '00038-US1 application, the response may comprise a fake completion response called therein "not ready". Thus, the host application is assured that it has a data storage drive, and, if needed, can retry or issue its next command relative to the drive. If the next command does not require that the drive be ready or that portable data storage cartridge be mounted and ready, the library may be able to handle the command immediately.

The drive resource provider, subsequent to providing the indications, awaits a request for deallocation of a data storage drive and demount of any portable data storage cartridge at the deallocated data storage drive, and allocates the deallocated data storage drive to the request for a drive, and indicates to the library to release the hold of the mount relative to the request.

The drive resource provider additionally assigns at least one of the plurality of library data storage drives as spare drives, outside of the pool. Then, the drive resource provider, subsequent to providing the indications, allocates one of the at least one spare drives to the request, and indicates to the library to release the hold of the mount relative to the request.

The drive resource provider, in an alternative embodiment, waits a predetermined time period, and, if during the predetermined time period a request for deallocation of a data storage drive and demount of any portable data storage cartridge at the deallocated data storage drive occurs, allocates the deallocated data storage drive to the request; else, subsequent to expiration of the time period, the drive resource provider allocates the spare data storage drive to the request.

As still another embodiment, the library comprises a plurality of virtual libraries, and at least one of the plurality of virtual libraries has a higher priority than other of the virtual libraries. The drive resource provider determines the priority of the virtual library of the virtual drive request, and, if the virtual library is of the higher priority, allocates the spare drive in response to the request, and indicates to the library to release the hold of the mount relative to the request.

In a further embodiment, the use of spare drives is limited. The drive resource provider increments a count each instance the request is received when all of the data storage drives of the pool are allocated. The drive resource provider compares the incremented count to a predetermined limit, and, upon the incremented count being less than the predetermined limit, allocates the spare data storage drive.

As a still further embodiment, the drive resource provider additionally, subsequent to the allocation of the spare data storage drive, posts a message indicating use of the spare data storage drive. The posted message, in one embodiment, comprises a notification to a system operator that action may be taken to transfer a spare data storage drive to the pool. As an example, transferring a spare drive to the pool will result in an increased cost for the library. If the transfer is made, the drive resource provider adds the spare data storage drive to the pool, deleting the drive as a spare data storage drive.

In another embodiment, as an incentive, the posted message additionally comprises a notification that failure to transfer the spare drive to the pool will result in future unavailability of spare data storage drives, and the drive resource provider, upon absence of a request to transfer at least one spare data storage drive to the pool, deletes the assignment of at least one of the plurality of library data storage drives as spare drives, such that the assigned spare drives become unassigned.

As the result, the host application is allocated a drive as soon as a drive is deallocated, or is allocated a spare drive.

Additionally, if needed, the system is provided with spare drives, and as the system requirements grow, the system operator is allowed to selectively increase the number of data storage drives in the pool by permanently adding spare drives to the pool, without a requirement to first contact a salesperson.

For a fuller understanding of the present invention, reference should be made to the following detailed description taken in conjunction with the accompanying drawings.

BRIEF DESCRIPTION OF THE DRAWINGS

FIGS. 5A and 5B are diagrammatic illustrations of exemplary drive image tables in accordance with the present invention;

FIG. 6 is a diagrammatic illustration of an exemplary drive table in accordance with the present invention;

FIG. 7 is a diagrammatic illustration of an exemplary library image table in accordance with the present invention;

FIG. 8 is a flow chart depicting an embodiment of the method of the present invention for configuring or altering the configuration of the drives of the automated data storage library of FIGS. 2 and 3;

FIG. 9 is a flow chart depicting an embodiment of the method of the present invention for the drive image provider of FIG. 1;

FIGS. 10A and 10B are a flow chart depicting an embodiment of the method of the present invention for the drive resource provider of FIG. 1 for triggering events;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
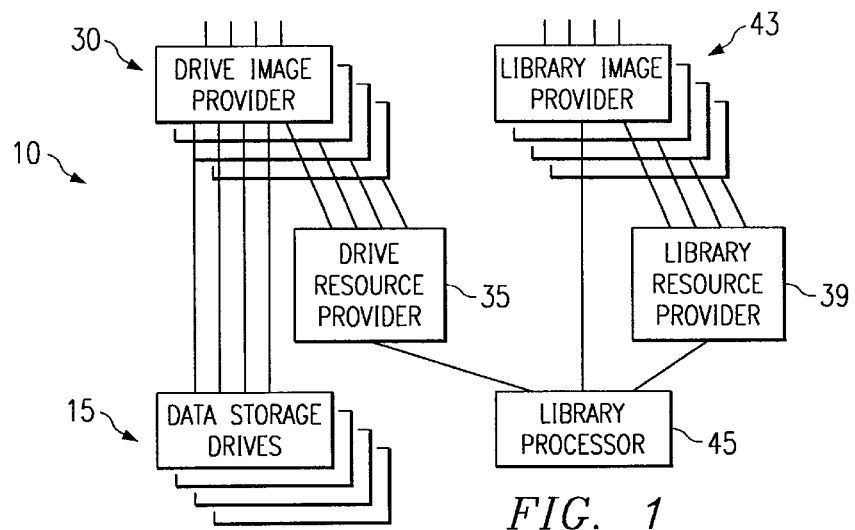
FIG. 1 is a diagrammatic representation of a virtualization system in accordance with the present invention.
Figure 2:
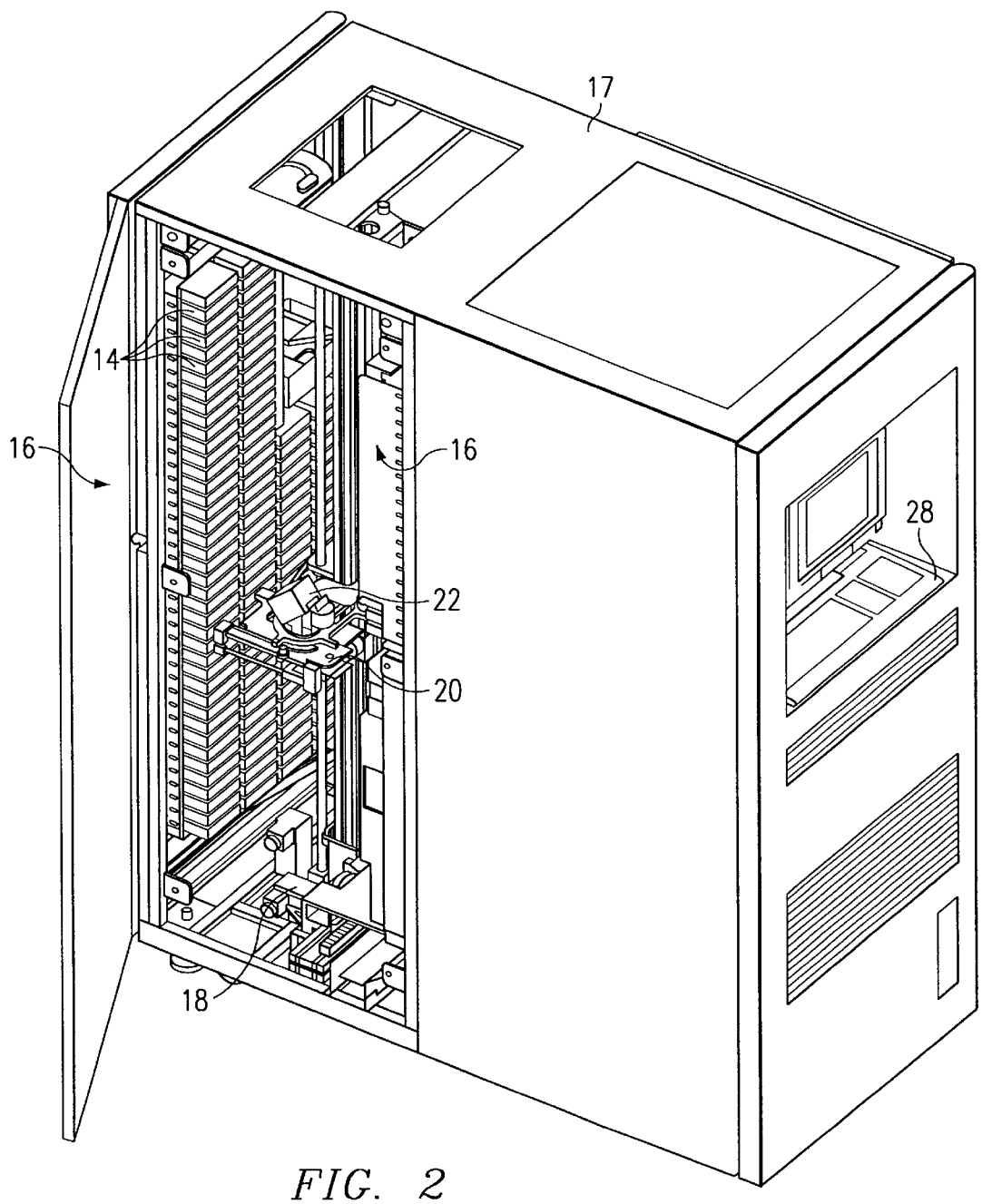
FIG. 2 is an isometric view of an automated data storage library which may implement embodiments of the present invention.
Figure 3:
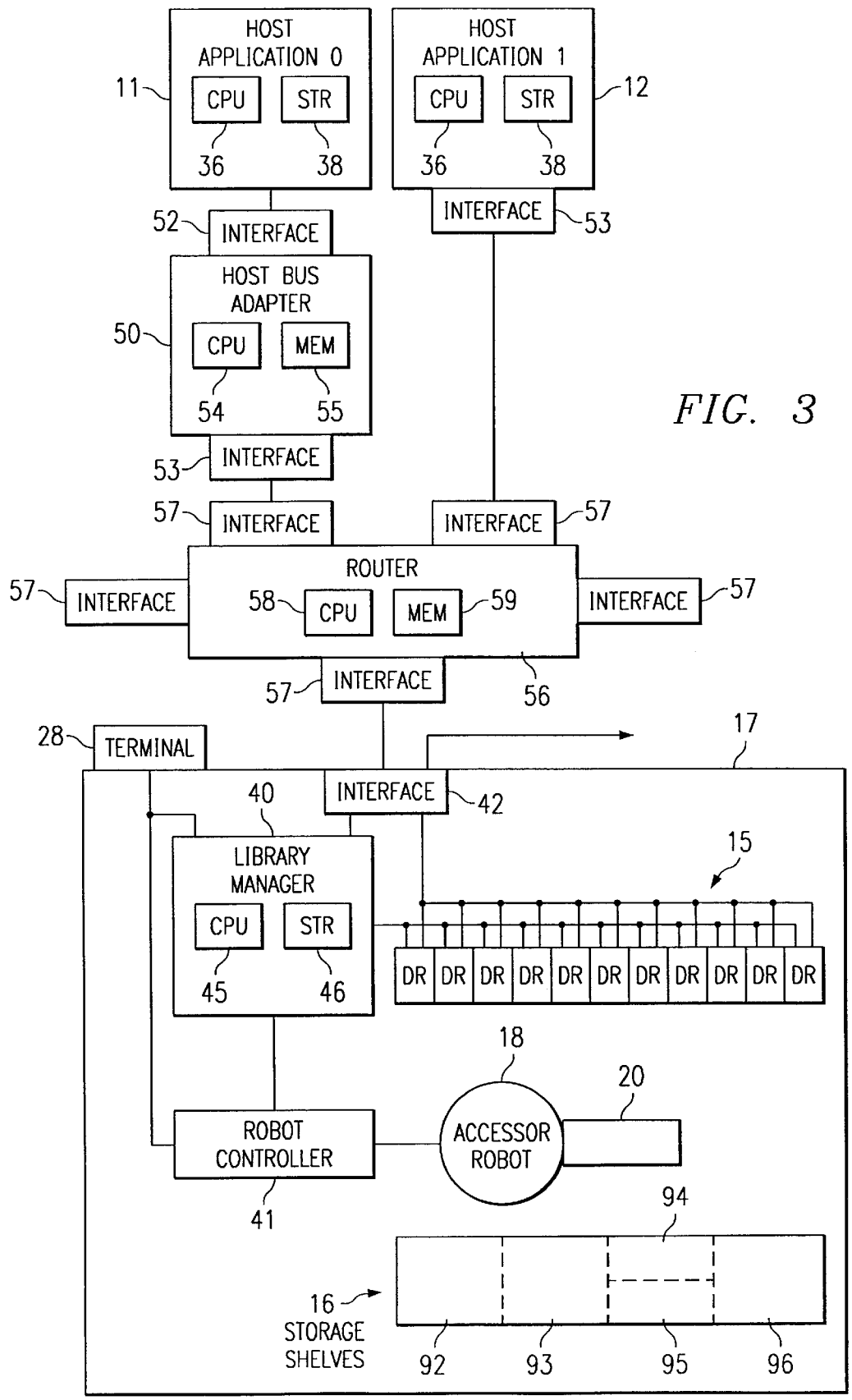
FIG. 3 is a block diagram of the automated data storage library of FIG. 2, together with host applications and components intermediate the host applications and the automated data storage library which may implement embodiments of the present invention.

Referring to FIGS. 1–3, an embodiment of a virtualization system 10 is illustrated which directs communication between host applications, such as host applications 11, 12, and data storage drives 15 of an automated data storage library 17. The library stores a plurality of portable data storage cartridges 14 in storage shelves 16 and provides an accessor robot 18, 20 for transporting the portable data storage cartridges between the storage shelves and the data storage drives.

At least one drive image provider 30 is coupled to one or more host applications 11, 12, and provides an image of at least one fixed virtual data storage drive to each host application, while actually directing communication between the host application and data storage drives of a pool of "n" data storage drives 15 of the automated data storage library. The drives 15 of the library are thus shared between the host applications. The drive image provider depicts the image in communications with the host by employing fixed identifications and fixed sets of responses to the host application for each of the virtual drives, such that the host application is provided with the appearance that all of the host's virtual drives are dedicated to the host all of the time. Further, the underlying physical drives may be different at various accesses, and drives may be added, deleted or replaced, all without requiring a reconfiguration of the host application device driver.

A drive resource provider 35 is coupled to the drive image providers 30. At any one time, the drive resource provider has assigned any number "m" of the pool of "n" data storage drives to the drive image providers, and "n"-"m" of the pool of data storage drives are indicated as freed and available for assignment.

The drive resource provider 35 responds to a triggering event requesting a drive for the host application virtual drive, and dedicates one of the "n"-"m" data storage drives of the pool as the virtual drive, indicating the dedication for the drive image provider for the requesting host application as one of the fixed virtual drives.

The drive image provider 30 characterizes the dedicated data storage drive to the requesting host application as one of the fixed virtual drives, and directs communication to the dedicated data storage drive 15 by the requesting host application 11, 12 as the virtual drive.

Prior to dedication of a physical drive as a virtual drive, the drive image provider 30 characterizes the virtual drive to the requesting host application as "not ready". As an example, "not ready" comprises a fake completion response of a reported state that no media is loaded in the drive.

In accordance with the present invention, the drive resource provider 35, upon receiving a request for a data storage drive when all of the data storage drives of the pool are allocated, indicates to the library to hold any mount of a portable data storage cartridge relative to the request. Additionally, upon receiving the request when all of the drives are allocated, an indication may be made that the requested drive is available for mounting a portable data storage cartridge, but is currently unavailable to conduct any subsequent command requiring a mounted portable data storage cartridge. Thus, the host application 11, 12 is assured that it will have a data storage drive, and can retry or issue its next command relative to the drive. If the next command does not require that the drive be ready or that portable data storage cartridge be mounted and ready, the library may be able to handle the command.

The drive resource provider 35, subsequent to providing the indications, awaits a request for deallocation of a data storage drive and demount of any portable data storage cartridge at the deallocated data storage drive, and allocates the deallocated data storage drive to the request for a drive, and indicates to the library to release the hold of the mount relative to the request.

In one example, one or more library image providers 43 may also be provided for virtual libraries, and will comprise a set of the virtual drives and a set of the storage shelves 16, which are defined by a library resource provider 39. Data storage drives 15 are shared between virtual libraries, but storage shelves 16 are preferably separate.

A host application 11, 12 may comprise a host processor, such as an IBM RS/6000 or an IBM eServer pSeries processor, and all the applications running on the host processor, or may comprise one of multiple applications running on the host processor. Thus, the host applications are depicted as each comprising a processing system having a processor 36 and storage 38.

The automated data storage library 17, as an example, comprises an automated tape cartridge storage and retrieval library for storing and accessing data storage media comprising physical volumes of magnetic tape cartridges, such as an IBM 3584. Alternatively, the automated data storage library 17 may comprise an optical storage and retrieval library or a tape cassette library, etc., each defined herein as storing portable data storage cartridges. The data storage drives 15 read and/or write data on the media, and may comprise a processor. The library further comprises a robot controller 41 for operating the accessor robot 18, 20, and a library manager 40. The accessor robot 18, 20 comprises a gripper 20 for engaging a selected portable data storage cartridge 14, and an accessor 18 for moving the gripper between a storage shelf 16 and a drive 15, or between storage shelves. The accessor robot 18, 20 may also comprise a bar code scanner 22, or similar vision system, mounted on the gripper 20, to "read" identifying cartridge labels. The data storage drives 15 can be optical disk drives or magnetic tape drives and the portable data storage cartridges can comprise cartridges or cassettes containing optical or magnetic media, respectively, or any other removable storage.

The robot controller 41 and library manager 40, comprise at least one computer processor and associated storage, and are coupled to an input/output interface 42 and a terminal 28. The computer processor may comprise, for example, an IBM RS/6000 processor. Alternatively, robot controller 41 and library manager 40 may each comprise a computer processor, and the computer processors are interconnected. In the example, library manager 40 comprises a computer processor 45 and associated storage 46. The terminal 28 may comprise a station for reading a data storage medium, such as a floppy disk or CD-ROM.

The library manager 40 is coupled with, and controls the load/unload and related actions of, the drives 15, and the library manager 40 is coupled with, and coordinates the operation of the robot controller 41. The library manager is coupled through the interface 42 to the host applications 11, 12. The library manager 24 has a library manager database which is stored in storage 46 (typically one or more hard disk drives or flash EEPROM) for tables and programs. Data access commands and information to be recorded on, or to be read from, selected portable data storage cartridges 14 are transmitted between the drives 15 and the host applications as directed by the data image provider 30. The library manager 40 defines each portable data storage cartridge in terms of its identifier, which is typically a volume serial number, or VOLSER, or, alternatively, in terms of its location.

The host applications 11, 12 are typically coupled to the library 17 by one or more components intermediate the host application and the automated data storage library.

An example of an intermediate component is a host bus adapter 50. In one example, the host bus adapter 50 comprises interfaces 52 and 53 which each interfaces with the appropriate connections to couple to the library or to other intermediate components, and to the host applications 11, 12, such as PCI, ESCON, FICON, SCSI, FIBER CHANNEL, etc. The adapter comprises a processor 54 and non-volatile memory 55, and suitable buffers and interconnections. An example of a host bus adapter 50 comprises an IBM eServer pSeries Gigabit Fibre Channel Adapter. Host application 12 is shown with an interface 53 which may comprise an adapter.

Another example of an intermediate component comprises a gateway or router 56 having a plurality of interfaces 57 with the appropriate connections to interconnecting a number of processors in a network, such as discussed above. The gateway or router comprises a processor 58 with a non-volatile memory 59 for storing the operating system, etc. An example of a gateway or outer is the IBM 2108 SAN Data Gateway. Other suitable terminology for the present adapter, router or gateway are "controller", "director" or "intelligent switch", and those of skill in the art may envision other applications.

The processors 54, 58 may comprise microprocessors, such as the Intel i960.

In accordance with the present invention, the drive image providers 30 and/or the drive resource provider 35 may be embedded in any of a host application 11, 12, an intermediate component 50, 56, or the automated data storage library 17. As one example, the drive image providers 30 are each incorporated into a device driver of the associated host application 11, 12, and the drive resource provider is incorporated into a component 56 intermediate the host applications and the automated data storage library 17. The drive resource provider must be at a component coupled to each of the hosts, or host bus adapters of hosts, having a drive image provider. As still another example, the drive image provider(s) 30 comprise a component 50, 56 intermediate the host application(s) 11, 12 and the automated data storage library 17, and the drive resource provider 35 comprises a component 56 intermediate the host bus adapter 50 or host and the library 17. As a further example, drive image providers 30 comprise device drivers of the associated host applications 11, 12, and the drive resource provider 35 comprises a component of the automated data storage library 17, such as the library manager 40. A still further example comprises the drive image provider(s) 30 as incorporated in a component 50, 56 intermediate the host application and the automated data storage library, and the drive resource provider 35 comprises a component of the automated data storage library 17.

The library image provider(s) 43 and the library resource provider 39 are preferably both incorporated into the automated data storage library 17.

Each of the processors 36 of the host applications 11, 12, processors 54, 58 of the intermediate components 50, 56, and processor 45 of the library manager 40 of the library, may be provided with an operating system and application programs, and may comprise programs for operating in accordance with the present invention. Each processor may be provided with a database, respectively, 38, 55, 59, 46, which includes storage (typically non-volatile memory or one or more hard disk drives) for tables and programs. The application programs may comprise one or more computer program products, comprising computer readable program code. The computer program product of the present invention may be supplied with an application program and stored in the provided storage, may be supplied with a diskette or CD-ROM at terminal 28, and comprises an article of manufacture, may be received from one of the host systems 11, 12, may be received from the network, or may be received by other similar means. The requirement for the storage media or memories is that they store digital representations of computer executable instructions. The computer readable program code operates the devices through their computer processor or processors.

Figures 4A, 4B:
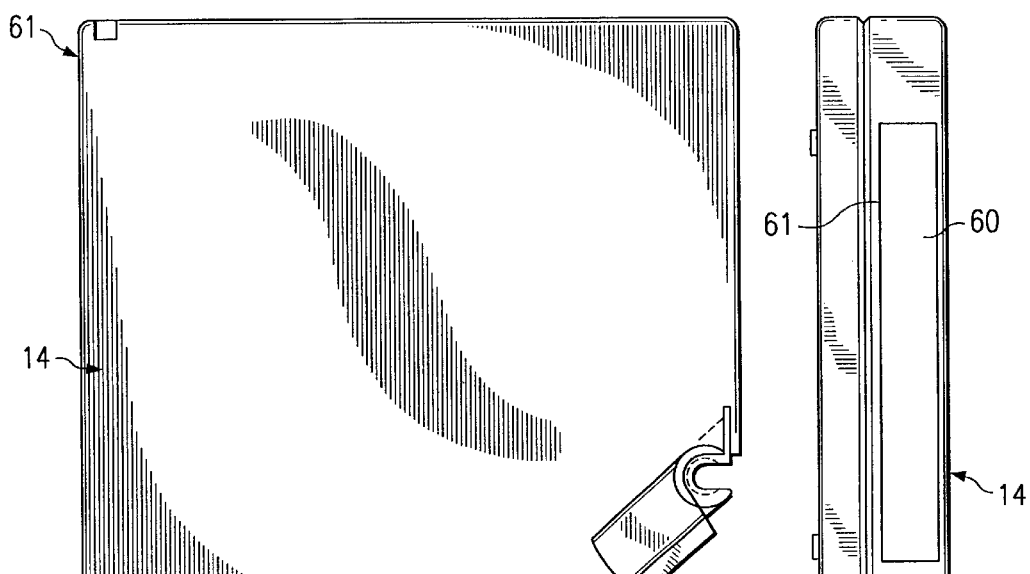
FIGS. 4A and 4B are respectively top and end views of an exemplary portable data storage cartridge which may be stored in the storage shelves of the automated data storage library of FIGS. 2 and 3.

In FIGS. 4A and 4B, an example of a portable data storage cartridge 14 is illustrated, which, for example, comprises a magnetic tape cartridge. The cartridge 14 has an identifying label 60 on an outer edge 61.

FIGS. 5A and 5B illustrate examples of drive image tables 70, 71 that are generated and maintained by the drive resource provider 35 and which are provided to the drive image providers 30 of FIG. 1, in which the drive resource provider maps the allocated and dedicated drives of the pool of data storage drives to the virtual drives of each host application. The drive image tables may be read by the drive image providers periodically from the drive resource provider and updated, for example, each half second, or each drive image provider may access the associated drive image table as needed. The drive image provider does not need to refresh the table each time, but rather may look for any changes.

The drive image table includes a list 75 of the virtual drives that the drive image provider is to report and provide responses for. As an example, in SCSI terms, the list 75 may comprise a fixed address such as a tape drive LUN identifier for each of the virtual drives. The drive image provider provides an image to a host application of one or more virtual data storage drives in fixed terms, and those drives are identified by means of the list 75. The fixed list is supplemented by an identification of the characteristics of each virtual drive 76 so that the drive resource provider may provide fixed identifications and fixed sets of responses to the host application for each of the virtual drives. As one example, the characteristics may include an unique serial number for the virtual drive. As a further example, the characterization may comprise the same address for the virtual drive. As an additional example, the virtual drive may be provided with characteristics which include a type or manufacturer designation and a model number. This will allow the drive resource provider to determine the fixed set of responses from its database. As an alternative embodiment, the drive image table of the drive resource provider may comprise only an identifier 75 for each virtual drive, and the drive image provider may maintain the characteristics 76 for each virtual drive.

As the drive resource provider dedicates drives from the pool of physical drives of the library to the drive image provider for the host application, those drives are also identified 77, for example, by LUN, in SCSI terms. In the illustrated example, the "*" represents an indication that no physical drive is currently assigned virtual drive. Also, a "W" represents that a physical drive will be assigned, but none is currently assigned, as will be discussed. Optionally, the drive resource provider may also provide the characteristics 78 of each assigned physical drive, such as a serial number, type, manufacturer designation and/or model number.

Referring additionally to FIG. 6, the drive resource provider 35 and/or the library resource provider 39 of FIG. 1 maintains a drive table 80 of the physical drives 81 and their current assignment or status 82. Preferably, the table 80 also includes the characteristics 83 of each of the physical drives, as above.

Referring additionally to FIG. 7, the library 17 of FIGS. 2 and 3 may be arranged to be directly coupled to the host applications and receive, for example, requests for the library to mount identified portable data storage cartridges 14 from storage shelves 16 at identified virtual drives. To accommodate these requests, the library comprises at least one library image table 85. The table identifies the virtual libraries 90, and the virtual drives 87 dedicated to each virtual library. Additionally, the library may indicate the priority 88 of the virtual library, and which virtual library or virtual drive is authorized 89 to use a spare drive. This information is presented to the host applications by means of the library image provider 43 of FIG. 1.

Each virtual library is assigned a set of the storage shelves 16. The same virtual library may be shared by multiple host applications or may comprise a separate virtual library for each host application, or there may be a mix. Table 85 identifies the virtual libraries in column 90, and the set of storage shelves 16 of FIGS. 2 and 3 assigned to each virtual library are identified in column 91. As is known to those of skill in the art, the storage shelves of an automated data storage library may be partitioned by the library manager such that each virtual library is assigned a specific set of storage shelves, such as storage shelves 92–96 in FIG. 3. The virtual libraries are arranged by the library resource provider 39 of FIG. 1. Preferably, the virtual libraries, as well as the host applications, share all or most of the physical drives 15 of the library 17 of FIGS. 2 and 3, as depicted in column 97. Certain data storage drives may be withheld from a pool of "n" drives for a virtual library as being of a type that does not match the requirement of the virtual drives. One example is a low speed drive useful in only particular situations. Another example is a streaming drive not useable for small data records.

In the illustrated tables 70, 71, 80 and 85 of FIGS. 5A, 5B, 6 and 7, as examples, physical drive "DR3" is assigned in the drive image table 70 as virtual drive "AA", and is in virtual library "0". The drive will be deallocated when released by the host application or when the host application issues a command to demount a portable data storage cartridge mounted in the drive. Physical drive "DR1" is assigned in drive image table 71 for virtual library "1", and is dedicated as virtual drive "EE". The "(L)" is an indication that the physical drive is locked to the host application as the virtual drive until specifically released by the host application, and the drive will not be deallocated when the host application issues a command to demount a portable data storage cartridge mounted in the drive.

The relative priorities 88 of the virtual libraries means that, in the circumstance where "n"-"m" data storage drives of the pool equals zero, indicating that all drives of the pool have been assigned, a higher priority host application, e.g., priority "0", may take a drive already dedicated to a lower priority host application, e.g., priority "1". With the use of virtual libraries, the tables depict the option of assigning physical drives 97 to virtual libraries 90, thereby defining a pool of data storage drives. If only one library was employed, all the data storage drives except spares constitute the pool of drives. Physical drive "DR2" is, at the moment, unassigned to any virtual drive, and is indicated as "FREED" and available for assignment. Physical drive "DR7" is reserved as a "SPARE" drive, and can only be used in the circumstance where "n"-"m" data storage drives of the pool equals zero, indicating that all drives of the pool have been assigned, and, either there is no priority reallocation, or all drives that could be reallocated have high priority assignments. If spares are authorized as shown by column 89, the drive resource provider then allocates one of the spare drives to the request. Alternatively, the drive resource provider waits a predetermined time period, and, if during the predetermined time period a request for deallocation of a data storage drive and demount of any portable data storage cartridge at the deallocated data storage drive completes, allocates the deallocated data storage drive to the request; else, subsequent to expiration of the time period, the drive resource provider allocates the spare data storage drive to the request.

Subsequent to the allocation of the spare data storage drive, the drive resource provider posts a message indicating use of the spare data storage drive. The posted message may comprise a notification to a system manager that action may be taken to transfer a spare data storage drive to the pool. As an example, transferring a spare drive to the pool will result in an increased cost for the library. If the transfer is made, the drive resource provider adds the spare data storage drive to the pool, deleting the drive as a spare data storage drive.

As an incentive, the posted message may additionally comprise a notification that failure to transfer the spare drive to the pool will result in future unavailability of spare data storage drives, and the drive resource provider, upon absence of a request to transfer at least one spare data storage drive to the pool, deletes the assignment of the plurality of library data storage drives as spare drives at least to one virtual library, such that the assigned spare drives become unassigned to the virtual library or, alternatively, in the library system.

In drive image table 70 of virtual library 0, virtual drive "BB" has no dedicated data storage drive, and is in the circumstance that the host application requires a physical drive. However, no physical drive, either a spare drive or a drive from a lower priority virtual library or lower priority virtual drive is available. Thus, the "W" means that there will be a wait until a data storage drive becomes available in the normal operation of the library.

FIG. 8 illustrates an embodiment of the method for configuring the data storage drives 15 of the library 17 of FIGS. 2 and 3, or of configuring the virtual libraries.

The configuration begins at step 100 in a startup or initialization of the library. Alternatively, a physical drive may be added, deleted or replaced and the reconfiguration begun at step 101. Still alternatively, a system operator, having used a spare data storage drive and received the message as discussed above, may choose to add one or more of the spare drives to a pool of drives, beginning at step 102. If the system operator was presented with the choice of employing the spare drive in a pool or of losing the drive as a spare and chooses to lose the drive (an unlikely scenario), step 102 could also provide a reassignment of the formerly spare drive or drives to an "unassigned" status. No reconfiguration of the library is actually required in this circumstance.

Step 105 may be employed for the situation where the use of virtual libraries is optional, and determines whether virtual libraries implemented. If virtual libraries are implemented, "YES", step 106 determines the next virtual library to be configured. If virtual libraries are not implemented, "NO", the physical library will be configured for a single set of virtual drives. The process may be conducted by the library resource provider and/or the drive resource provider, and the library resource provider is required if virtual libraries are implemented. If virtual libraries are not implemented, the library image table 85 of FIG. 7 will comprise only a single library, eliminating column 90.

In step 110, the physical drives available to the library are determined. This information may be provided by the system operator or may comprise a default, for example, in which all of the number of drives are shared by all the virtual libraries. In step 111, the spare drives are identified. The spare drives may be established at the time that the library 17 of FIGS. 2 and 3 is sold or installed, or may be set by the system operator to control the price paid for the library. The number of physical drives "n" in the pool of drives for the virtual library is the number of available physical drives PD less the number of spare drives SD.

In step 120, the number of virtual drives and the fixed identification of each of the virtual drives are determined, for example, from the responsible system operator, or from the device driver, for communication with each host application. This comprises the identifier to be employed by the host application to address the fixed virtual drives, and as illustrated in column 75 of FIGS. 5A and 5B, in column 87 of FIG. 7, and is used for the allocation shown in column 82 of FIG. 6. The characterization information 76, 83 may also be obtained at this point. In step 115, the relative priorities of the virtual libraries are determined, for example, by the system operator. As an alternative, relative priorities may be determined for the virtual drives. The resultant relative priorities are posted in column 88 of FIG. 7. Then, in step 121, the drive resource provider arranges the drive image table(s) 70, 71 for each drive image provider. The master drive image tables are maintained in the drive resource provider, mapping the allocated and dedicated drives of the pool of data storage drives to the virtual drives of each host application. As discussed above, the drive image tables may be accessed and refreshed or updated by the drive image providers periodically from the drive resource provider, or each drive image provider may access the associated drive image table as needed.

In step 125, the library resource provider determines whether all of the virtual libraries have been configured. If so, or if virtual libraries have not been implemented, the process is ended as illustrated by step 126. If not all of the virtual libraries have been configured, the process cycles back to step 106 to begin configuration of the next virtual library.

FIG. 9 illustrates the process of the drive image provider 30 of FIG. 1 when a host application provides a command for a, virtual drive at step 135. Examples of events are an INQUIRY command; a SEARCH command to search for specific data from a mounted portable data storage cartridge; a READ command to read data from a mounted portable data storage cartridge; a WRITE command to write data on a mounted portable data storage cartridge; a RESERVE command to reserve a data storage drive for future use; a RELEASE command to release a reserved data storage drive; or other similar types of commands.

The drive image provider, in steps 141 and 143, determines whether the command received from the host application constitutes a triggering event or a detriggering event. If the command constitutes a triggering event, the drive image provider, in step 144, notifies the drive resource provider of the event and identifies the virtual drive and may identify the host application. If the command constitutes a detriggering event, the drive image provider, in step 149, notifies the drive resource provider of the event and identifies the virtual drive and may identify the host application.

In step 140, the drive image provider looks up the virtual drive in the drive image table 70, 71 of FIGS. 5A, 5B for the virtual library.

Step 136 determines whether the command of step 135 requires a physical drive to complete the response to the event. For example, SEARCH, READ, and WRITE commands all require a physical drive. An INQUIRY command does not require a physical drive, and a response may be provided by the drive image provider without a drive, and the response is provided in step 137. The drive image provider responds as the addressed virtual drive, and employs the characteristics of the drive from the drive image table 70, 71 of FIGS. 5A, 5B, or equivalent. SEARCH, READ, and WRITE commands will be provided by a host application if a portable data storage cartridge is mounted in the dedicated physical drive, thus, a MOUNT command will have been provided to the library.

Commands that lead to the allocation and dedication of a physical drive to a virtual drive are called triggering events, and comprise RESERVE commands and other commands having the effect of a request for a drive, such as an "are you there" type of command. Commands that lead to the deallocation of a physical drive are called detriggering events, and comprise RELEASE commands and other commands having the effect of releasing a drive. RESERVE and RELEASE commands, and commands requesting or releasing a virtual drive are received by the drive image provider.

In step 142, the drive image provider determines from the drive image table whether a physical drive is dedicated to the virtual drive of the command. If a physical drive is dedicated to the virtual drive, "YES", the drive image provider, in step 143, directs communication between the requesting host application and the dedicated data storage drive of the pool of "n" data storage drives of the automated data storage library. The communication is destaged and translated as necessary so that, from the standpoint of the host application, the communication appears to be between the host application and the virtual drive. The communication comprises all that is expected to follow as the result of the command, and will include the transfer of data, etc., with any expected headers, etc.

If the host application has issued a MOUNT command to the library, it then is likely to issue a SEARCH, etc., command to the virtual drive. The command may be received prior to the update of the drive image table by the drive resource provider. Hence, the drive image provider, prior to drive resource provider dedicating a physical data storage drive from the pool, in step 142, determines from the drive image table that no physical drive has been dedicated to the requesting host application, and the drive image provider responds to the requesting host application with a fake completion response in step 150 having the effect of informing the host application that the request has been received, and that the virtual drive is "not ready" to complete any command requiring a mounted portable data storage cartridge. The drive image provider reports two types of "not ready" fake completion responses. In one example, if the virtual drive is indicated in the drive image table as waiting "w", the drive image provider reports that the virtual drive is "coming ready". In an alternative example, the drive image provider reports "cartridge not present" at the virtual drive. In either case, the "not ready" response is not an indication that any requested work is complete. Rather, it is a form of command rejection based on one of the two reasons.

Upon step 136 indicating that no physical drive is required, such as an INQUIRY, RESERVE, or RELEASE command, etc., as discussed above, the drive image provider responds as the addressed virtual drive, employing the characteristics of the virtual drive from the drive image table 70, 71 of FIGS. 5A, 5B.

Figure 10A:
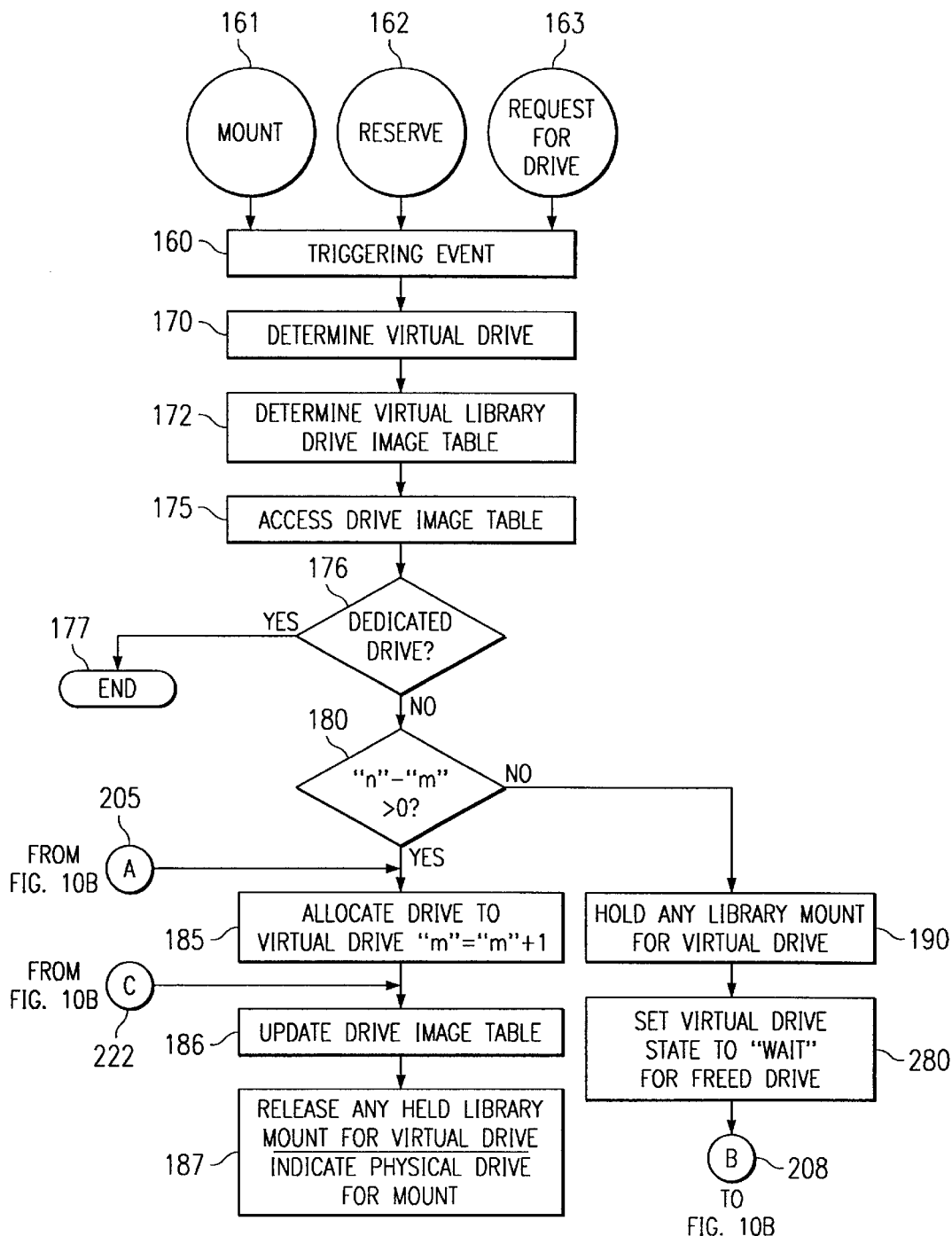

Referring to FIGS. 10A and 10B, step 160 refers to the occurrence of a triggering event, such as receipt of a MOUNT command 161, a RESERVE command 162, or a request 163 for a drive, such as an "are you there" request, with or without a request to lock the drive. The request will have been received by the drive image provider and the drive resource provider notified in step 144 of FIG. 9, or, if a MOUNT command received directly by the library, or virtual library, it is provided to the drive resource provider as a direct triggering event.

In step 170, the drive resource provider determines the virtual drive for which the triggering event is intended by the requesting host. This typically is determined from the notification or command itself. In step 172, the drive resource provider determines the drive image table 70, 71 of FIGS. 5A and 5B for the virtual drive.

Having determined the drive image table, the drive resource provider accesses the drive image table in step 175. In step 176, the drive resource provider determines from the drive image table whether a physical drive is dedicated to the virtual drive of the event. If the drive has been dedicated, the process ends in step 177 and the drive image provider is directing communication between the requesting host application and the data storage drive as the virtual drive, as illustrated in step 143 of FIG. 9.

If no drive has been dedicated, the drive resource provider, in step 180, determines whether "n"-"m" is greater than zero, e.g., from the drive table 80 in FIG. 6. If "n"-"m" is greater than zero, "YES", not all of the physical drives have been allocated and a physical drive is therefore available for allocation and dedication to the requesting host application. As discussed above, the pool of drives may comprise only data storage drives that are compatible with the characteristics of the virtual drive. As an example, many of the physical drives may be streaming drives and the requested virtual drive may instead be a stop-start drive.

If a physical drive is available, such that "n"-"m">0, the drive resource provider, in step 185, allocates the physical drive to the virtual drive, dedicating the physical drive for the requesting host application. If more than one drive is available, the selection of the specific drive may be made in accordance with any appropriate algorithm. As one example, the drive having the closest characteristics to the virtual drive may be selected. As another example, the drive having been idle the longest may be selected. The drive resource provider thus increments "m" to the value "m"+1.

Upon allocating the physical data storage drive in step 185, the drive resource provider updates the drive image table 70, 71 of FIG. 5A or 5B. As discussed above, the drive resource provider thus maps the allocated and dedicated drives of the pool of data storage drives to the virtual drives of each host application. The updated drive image tables may be accessed by the drive image providers periodically from the drive resource provider, or each drive image provider may access the associated drive image table as needed. The drive table 80 of FIG. 6 is also updated and may comprise the allocation of the drive of step 185. In step 187, the drive resource provider indicates to the library to release any hold of a mount of a portable data storage cartridge relative to the request, as will be discussed.

If no physical data storage drive is available, as indicated by step 180 determining that "n"-"m" is equal to zero, "NO", indicating that a request has been received for a data storage drive when all of the data storage drives of the pool are allocated, the drive resource provider, in step 190, indicates to the library to hold any mount of a portable data storage cartridge relative to the request. In this manner, the library does not initiate a mount, which would begin movement of the accessor robot to select the desired portable data storage cartridge, when no physical drive is available at which to mount the cartridge. Prevention of a mount without a drive prevents a potential lockup of the accessor robot with a cartridge to be mounted on one drive, while the same accessor robot may be required to demount another cartridge so as to make the drive of the demount available. Additionally, in step 190, a fake completion response is provided to the mount request, which prevents a potential "command" lockup, in the instance where commands can only be dealt with in order. Once a drive is available and any cartridge has been demounted, the mount is released, in step 187. If step 180 indicates that no drive is allocated, the drive resource provider, in step 280, posts an indication "W" in the drive image table (e.g., table 70 of FIG. 5A) for the drive image provider indicating that the drive resource provider is waiting for a freed drive.

Various optional alternatives may be employed to allocate a physical drive, rather than just waiting for a presently allocated drive to be deallocated. These alternatives are discussed hereinafter, and may be implemented in any order.

If step 180 indicates that no drive is available, connector 208 leads to FIG. 10B and to step 210. Step 210 relates to the situation in which virtual libraries or virtual drives are assigned relative priorities, as depicted in column 88 of library image table 85 of FIG. 7. Thus, with a plurality of virtual libraries, where at least one of the virtual libraries has a higher priority than other of the virtual libraries, the drive resource provider, in step 210 determines the priority of the virtual library or the requested virtual drive, and whether the requesting virtual library or virtual drive is of the higher priority. If the requesting virtual library or virtual drive is of the higher priority, the drive resource provider, in step 211, selects a data storage drive from a lower priority virtual library. In step 212, the drive resource provider deallocates the selected data storage drive from the drive image table of the lower priority virtual library, notifies the drive image provider of the deallocation, and notifies the library to demount, in step 215, any portable data storage cartridge from the deallocated data storage drive. The drive image provider, in step 216, characterizes the virtual drive of the deallocated data storage drive to its host application as "not ready". In step 220, the drive resource provider allocates the deallocated data storage drive for the higher priority virtual library. Connector 222 leads to step 186, where the drive is dedicated to the virtual drive of the requesting host application in the drive image table, and any hold of a mount is released in step 187. Any work queued in step 150 by the drive image provider is dequeued as the result of steps 185, 186 and 187.

As discussed above, the drive resource provider may additionally assign at least one of the plurality of library data storage drives as spare drives, outside of any pool. Then, the drive resource provider may allocate a spare drive to the request. As one example, spare drives may be employed if no physical drives are assigned in lower priority situations. Alternatively, a spare drive may be requested only for high priority virtual libraries. Thus, if step 210 determines that the requesting virtual library or virtual drive is of high priority, step 230 determines whether use of a spare drive is authorized. Whether or not priority of the host application plays part in the determination, the authorization of spares may be determined, for example, from column 89 of library image table 85 of FIG. 7.

Even though spares may be authorized, their use may be limited. As one example, a time-out is set in step 240, so as to allow time for a data storage drive to be deallocated and freed, as detected by step 243. If a drive is freed as indicated by step 243, connector 205 leads to step 185 of FIG. 10A to allocate the freed drive. If no drive is freed, as indicated by step 243, step 245 determines whether the time-out period has expired. If not, "NO", the process cycles back to step 243 to wait for a freed drive.

If the time-out period has expired, still another limitation on use of a spare may be employed. As one example, the use of spare drives may be limited to a predetermined number of times. As will be discussed, the system operator may be requested to add drives to the pool of "n" drives and prevented from unlimited use of spare drives. Specifically, in step 253, the drive resource provider increments a count each instance the request for a spare is received when all of the data storage drives of the pool are allocated. In step 254, the drive resource provider compares the incremented count to a predetermined limit, and, upon the incremented count being less than the predetermined limit, in step 255, allocates the spare data storage drive to the virtual library of the request. The drive table 80 of FIG. 6 and the library image table 85 of FIG. 7 are updated, moving the drive from a spare to a freed drive, temporarily incrementing the pool of drives "n" to a value of "n"+1, and assigning the drive to the virtual library of the request in column 97 of table 85. Connector 205 leads to step 185 of FIG. 10A for allocation of the now freed drive to the virtual drive of the requesting host application.

As an option, the drive resource provider additionally, subsequent to the allocation of the spare data storage drive, in step 260, posts a message indicating use of the spare data storage drive. The posted message, in one embodiment, comprises a notification to a system manager that action may be taken to transfer a spare data storage drive to the pool. As an example, transferring a spare drive to the pool will result in an increased cost for the library. If the transfer is made, the drive resource provider permanently adds the spare data storage drive to the pool, deleting the drive as a spare data storage drive.

In another embodiment, as an incentive, the posted message additionally comprises a notification that failure to transfer the spare drive to the pool will result in future unavailability of spare data storage drives, and the drive resource provider, upon absence of a request to transfer at least one spare data storage drive to the pool, deletes the assignment of the data storage drives as a spare drive, such that the assigned spare drive becomes unassigned. As discussed above, the uses of spare drives may be limited by the predetermined limit of step 254.

In the event that no spare drive is authorized in step 230, or that the incremented count of step 253 has reached the predetermined limit of step 254, the drive resource provider, in step 282, awaits a request for deallocation of a data storage drive and demount of any portable data storage cartridge at the deallocated data storage drive, freeing the data storage drive. If no drive is freed, as determined by step 282, the process continues to loop. Upon deallocation of a drive, step 282 leads to connector 205 of FIG. 10A for allocation of the deallocated data storage drive to the virtual drive for the host application requesting the drive in step 185, and indicating to the library to release the hold of any mount relative to the request in step 187.

In addition to releasing any held library mount, the drive resource provider provides an indication of the dedicated physical data storage drive at which any held or any future mount is to be executed. The indication comprises the posting to the drive table 80 of FIG. 6, which is accessed by the library. As a supplemental alternative for a release of a held mount, the indication of the dedicated physical data storage drive is provided with the release indication communicated to the library.

Figure 11:
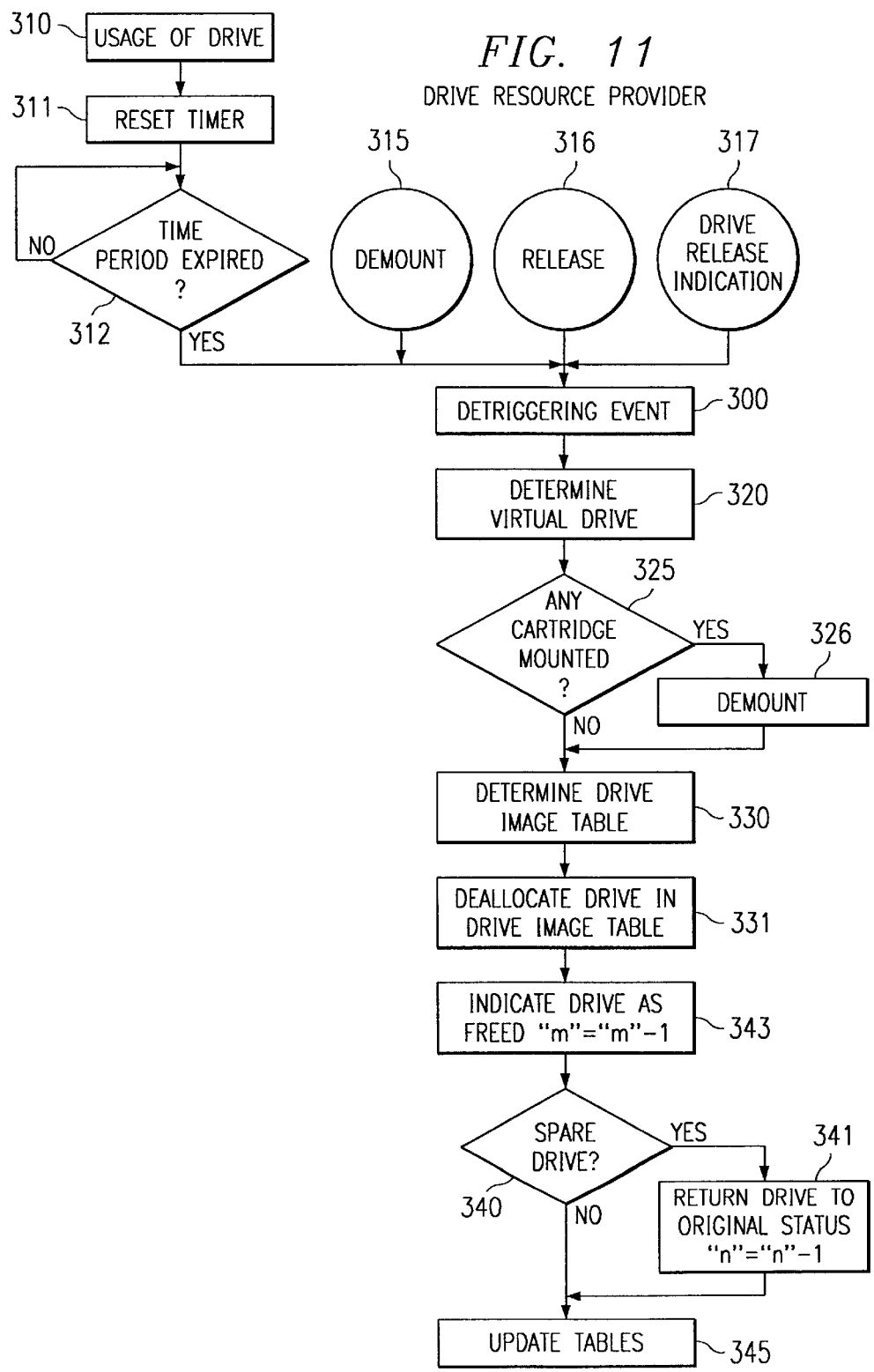
FIG. 11 is a flow chart depicting an embodiment of the method of the present invention for the drive resource provider of FIG. 1 for detriggering events.

FIG. 11 relates to detriggering events of step 300. One example of a detriggering event comprises non-use of a dedicated data storage drive for a predetermined time-out period. In one embodiment, the completion of a function comprising a usage of a drive is identified in step 310, and, in step 311, resets a timer for that drive. Then, step 312 continues to track the timer and indicates if the time period has expired.

Other detriggering events comprise a DEMOUNT request 315 to demount the cartridge from the virtual drive and move the cartridge to another point, such as a storage shelf; a RELEASE command 316 to release a reserved virtual data storage drive; and a drive release indication 317. As discussed above, a DEMOUNT command is typically provided to the library and is not a command received by the drive image provider in step 135 of FIG. 9. The library, upon receiving the DEMOUNT command, determines the physical data storage drive dedicated to the virtual drive, initiates the demount, and informs the data resource provider of the command. A RELEASE command or a command requesting release of a virtual drive is received by the drive image provider in step 135 of FIG. 9. The drive image provider determines in step 143 that it is a detriggering event; and notifies the drive resource provider in step 149. In step 320 of FIG. 11, the drive resource provider determines the virtual drive for which the detriggering event is intended by the requesting host. This typically is determined from the command itself.

Step 325 determines whether a portable data storage cartridge is mounted in the drive. This may be determined, for example, from the library processor 45 of FIG. 1. A DEMOUNT command will have resulted in a demount of the portable cartridge by the accessor robot, such that step 325 indicates that no cartridge is mounted in the drive. The other detriggering events may not occur with a portable cartridge mounted in a drive and may not comprise a demount. If a cartridge is mounted in the drive, the drive resource provider indicates to the library that the cartridge is to be demounted in step 326.

In step 330, the drive resource provider determines the drive image table 70, 71 of FIG. 5A or 5B for the virtual drive, or for the physical drive if steps 310–312 employ the physical drive.

The drive resource provider then, in step 331, deallocates the drive from the virtual drive for the host application. The drive resource provider, in step 343, then indicates that the drive is freed, decrementing "m" to "m"−1. Optionally, if spare drives are employed, step 340 determines whether the deallocated drive was shared drive. If so, step 341 returns the drive to its original status, decrementing "n" to "n"−1. If the drive was a spare, the system operator may subsequently respond to the message of step 260 of FIG. 10B and add one or more spare drives to the pool. If the drive was not a spare drive, the drive resource provider proceeds directly to step 345. In step 345, the tables are updated, either returning the drive to its original status as a spare drive in drive table 80 of FIG. 6, or indicating the drive as freed in the drive table of FIG. 6.

Figure 12A:
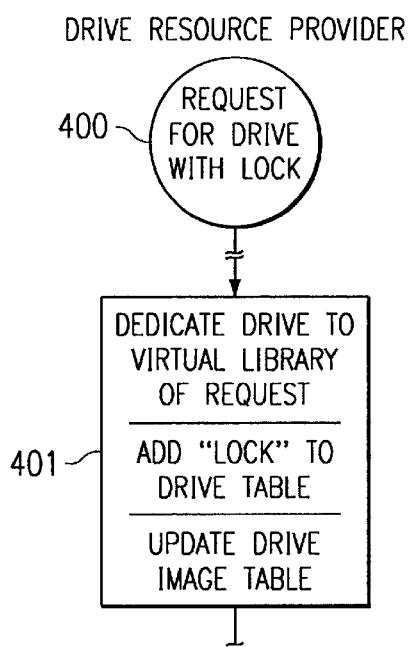
FIGS. 12A, 12B and 12C are flow charts depicting an alternative embodiment of the present invention for the drive resource provider of FIG. 1 for locking data storage drives.
Figure 12B:
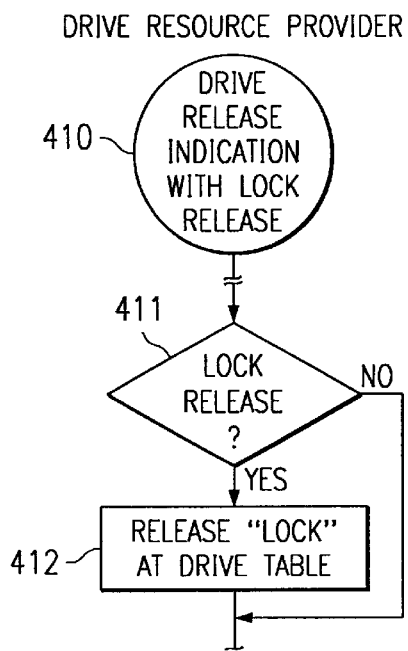
Figure 12C:
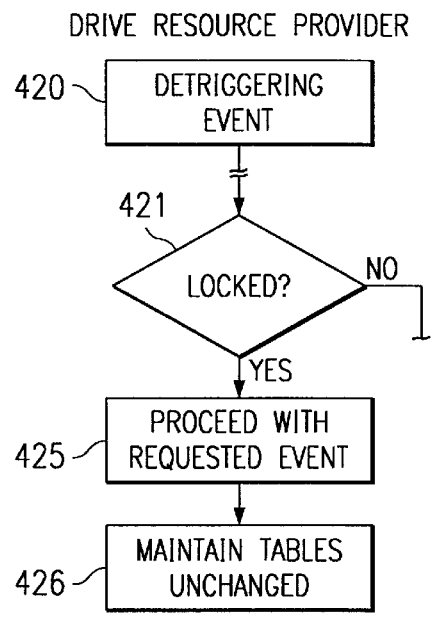

FIGS. 12A–12C represent locking and unlocking a data storage drive to a virtual library. Step 400 of FIG. 12A represents a triggering event 160 of FIG. 10A in which a drive is requested with a lock. Step 401 is equivalent to step 185 of FIG. 10A for dedicating the drive to the virtual drive, and additionally comprises adding the "lock" to the drive table, as illustrated by drive "DR1" of drive table 80 of FIG. 6.

Step 410 of FIG. 12B represents a detriggering event 300 of FIG. 11 in which a drive is released by the host application with a release of the lock. Step 411 may occur immediately subsequent to step 300, and comprises a determination whether the command includes a release of the lock. If so, the lock is released by the drive resource provider, in step 412, at the drive table 80 of FIG. 6.

Step 420 represents a detriggering event 300 of FIG. 11 which does not comprise a release of a lock, such as a DEMOUNT command. Step 421 determines whether the drive is locked, referring, for example, to the drive table 80 of FIG. 6. If the drive is not locked, the process of steps 320–345 of FIG. 11 is conducted. If the device is locked, and not unlocked in step 412 of FIG. 12B, the requested event is conducted in step 425, and the tables are maintained unchanged in step 426, so that the drive thereby remains locked to the host application.

The steps of the above processes may be altered in sequence or combined and changed in detail as appropriate.

While the preferred embodiments of the present invention have been illustrated in detail, it should be apparent that modifications and adaptations to those embodiments may occur to one skilled in the art without departing from the scope of the present invention as set forth in the following claims.

We claim:

1. An allocation system for allocating data storage drives of an automated data storage library in response to at least one request for a data storage drive, said library storing a plurality of portable data storage cartridges in storage shelves and transporting said portable data storage cartridges between said storage shelves and said data storage drives for mounting and demounting said portable data storage cartridges at said data storage drives, comprising:

a drive resource provider, assigning a plurality of said library data storage drives to a pool, and allocating and deallocating said data storage drives from said pool; to a plurality of virtual storage drives said drive resource provider, upon receiving said request for a data storage drive when all of said data storage drives of said pool are allocated, to the virtual storage drives indicating to said library to hold any mount of a portable data storage cartridge relative to said request.

2. The allocation system of claim 1, additionally comprising a drive image provider coupled to said drive resource provider, which, upon receiving said request for a data storage drive when all of said data storage drives of said pool are allocated, indicates that said requested data storage drive is currently unavailable to complete any subsequent command requiring a mounted portable data storage cartridge.

3. The allocation system of claim 1, wherein said drive resource provider additionally, subsequent to said indication, awaits a deallocation of a data storage drive and demount of any portable data storage cartridge at said deallocated data storage drive, allocates said deallocated data storage drive to said request, and indicates to said library to release said hold of said mount relative to said request.

4. The allocation system of claim 1, wherein said drive resource provider additionally assigns at least one of said plurality of library data storage drives as spare data storage drives, outside of said pool, and, subsequent to said indication, allocates one of said at least one spare data storage drives to said request, and indicating to said library to release said hold of said mount relative to said request.

5. The allocation system of claim 4, wherein said drive resource provider, subsequent to said indication, waits a predetermined time period, and awaits a deallocation of a data storage drive and demount of any portable data storage cartridge at said deallocated data storage drive; and, if during said predetermined time period said deallocation occurs, allocates said deallocated data storage drive to said request; else, subsequent to expiration of said time period, allocates said spare data storage drive to said request; and, upon said allocation of a data storage drive to said request, indicates to said library to release said hold of said mount relative to said request.

6. The allocation system of claim 4, where said library comprises a plurality of virtual libraries responsive to said at least one request for a data storage drive, said system allocating data storage drives of said automated data storage library to said plurality of virtual libraries, at least one of said plurality of virtual libraries a higher priority than other of said virtual libraries; and wherein said drive resource provider additionally determines said priority of said virtual library of said request for a data storage drive, and, only if said virtual library is of said higher priority, allocates said spare data storage drive to said request, and indicates to said library to release said hold of said mount relative to said request.

7. The allocation system of claim 4, wherein said drive resource provider additionally increments a count each instance said request is received when all of said data storage drives of said pool are allocated, compares said incremented count to a predetermined limit, and, upon said incremented count being less than said predetermined limit, allocating said spare data storage drive.

8. The allocation system of claim 4, wherein said drive resource provider additionally, subsequent to said allocation of said spare data storage drive, posts a message indicating use of said spare data storage drive.

9. The allocation system of claim 8, wherein said drive resource provider posted message comprises a notification to a system operator that action may be taken to transfer at least one said spare data storage drive to said pool.

10. The allocation system of claim 9, wherein said drive resource provider additionally responds to a request to transfer at least one spare data storage drive to said pool, adds at least one said spare data storage drive to said pool, deleting said data storage drive as a spare data storage drive.

11. The allocation system of claim 10, wherein said drive resource provider posted message additionally comprises a notification that failure to transfer said data storage drive to said pool will result in future unavailability of spare data storage drives, and wherein said drive resource provider, upon absence of a request to transfer at least one spare data storage drive to said pool, deletes said assignment of at least one of said plurality of library data storage drives as spare data storage drives, such that said assigned spare data storage drives become unassigned.

12. The allocation system of claim 1, wherein said drive resource provider additionally indicates that a fake completion response is to be provided in response to said mount.

13. An allocation method for allocating data storage drives of an automated data storage library in response to at least one request for a data storage drive, said library storing a plurality of portable data storage cartridges in storage shelves and transporting said portable data storage cartridges between said storage shelves and said data storage drives for mounting and demounting said portable data storage cartridges at said data storage drives, comprising the steps of:

assigning a plurality of said library data storage drives to a pool, and allocating and deallocating said data storage drives from said pool to a plurality of virtual storage drives;

upon receiving said request for a data storage drive when all of said data storage drives of said pool are allocated, to the virtual storage drives indicating to said library to hold any mount of a portable data storage cartridge relative to said request.

14. The allocation method of claim 13, additionally comprising the step of, upon receiving said request for a data storage drive when all of said data storage drives of said pool are allocated, indicating that said requested data storage drive is currently unavailable to complete any subsequent command requiring a mounted portable data storage cartridge.

15. The allocation method of claim 13, additionally comprising the steps of:

subsequent to said indication, awaiting a deallocation of a data storage drive and demount of any portable data storage cartridge at said deallocated data storage drive, allocating said deallocated data storage drive to said request; and indicating to said library to release said hold of said mount relative to said request.

16. The allocation method of claim 13, additionally comprising the steps of:

assigning at least one of said plurality of library data storage drives as spare data storage drives, outside of said pool; and subsequent to said indication, allocating one of said at least one spare data storage drives to said request, and indicating to said library to release said hold of said mount relative to said request.

17. The allocation method of claim 16, additionally comprising the steps of:

subsequent to said indication, for a predetermined time period, awaiting a deallocation of a data storage drive and demount of any portable data storage cartridge at said deallocated data storage drive; and if during said predetermined time period said deallocation occurs, allocating said deallocated data storage drive to said request; else, subsequent to expiration of said time period, allocating said spare data storage drive to said request; and, upon said allocation of a data storage drive to said request, indicating to said library to release said hold of said mount relative to said request.

18. The allocation method of claim 16, wherein said library comprises a plurality of virtual libraries responsive to said at least one request for a data storage drive, said method allocating data storage drives of said automated data storage library to said plurality of virtual libraries, at least one of said plurality of virtual libraries having a higher priority than other of said virtual libraries, said method additionally determining said priority of said virtual library of said request for a data storage drive, and, only if said virtual library is of said higher priority, allocating said spare data storage drive to said request, and indicating to said library to release said hold of said mount relative to said request.

19. The allocation method of claim 16, additionally comprising the steps of:

incrementing a count each instance said request is received when all of said data storage drives of said pool are allocated;

comparing said incremented count to a predetermined limit, and, upon said incremented count being less than said predetermined limit, allocating said spare data storage drive.

20. The allocation method of claim 16, additionally, subsequent to said allocation of said spare data storage drive, posting a message indicating use of said spare data storage drive.

21. The allocation method of claim 18, wherein said posted message comprises a notification to a system operator that action may be taken to transfer at least one said spare data storage drive to said pool.

22. The allocation method of claim 21, additionally comprising the steps of:

responding to a request to transfer at least one spare data storage drive to said pool, adds at least one said spare data storage drive to said pool, deleting said data storage drive as a spare data storage drive.

23. The allocation method of claim 22, wherein said posted message additionally comprises a notification that failure to transfer said data storage drive to said pool will result in future unavailability of spare data storage drives, and wherein said method additionally comprises, upon absence of a request to transfer at least one spare data storage drive to said pool, deleting said assignment of at least one of said plurality of library data storage drives as spare data storage drives, such that said assigned spare data storage drives become unassigned.

24. The allocation method of claim 13, wherein said indicating step additionally comprises indicating that a fake response is to be provided in response to said mount.

25. A computer program product of a computer readable medium usable with a programmable computer, said computer program product having computer readable program code embodied therein for allocating data storage drives of an automated data storage library in response to at least one request for a data storage drive, said library storing a plurality of portable data storage cartridges in storage shelves and transporting said portable data storage cartridges between said storage shelves and said data storage drives for mounting and demounting said portable data storage cartridges at said data storage drives, said at least one host application coupled to said data storage drives and to said automated data storage library, comprising:

computer readable program code which causes a computer processor to assign a plurality of said library data storage drives to a pool, and to allocate and deallocate said data storage drives from said pool; to a plurality of virtual storage drives computer readable program code which causes a computer processor to, upon receiving said request for a data storage drive when all of said data storage drives of said pool are allocated, to the virtual storage drives indicate to said library to hold any mount of a portable data storage cartridge relative to said request.

26. The computer program product of claim 25, additionally comprising computer readable program code which causes a computer processor to, upon receiving said request for a data storage drive when all of said data storage drives of said pool are allocated, indicate that said requested data storage drive is currently unavailable to complete any subsequent command requiring a mounted portable data storage cartridge.

27. The computer program product of claim 25, additionally comprising computer readable program code which causes a computer processor to:

subsequent to said indication, await a deallocation of a data storage drive and demount of any portable data storage cartridge at said deallocated data storage drive, and allocate said deallocated data storage drive to said request; and indicate to said library to release said hold of said mount relative to said request.

28. The computer program product of claim 25, additionally comprising computer readable program code which causes a computer processor to:

assign at least one of said plurality of library data storage drives as spare data storage drives, outside of said pool; and subsequent to said indication, allocate one of said at least one spare data storage drives to said request, and indicate to said library to release said hold of said mount relative to said request.

29. The computer program product of claim 28, additionally comprising computer readable program code which causes a computer processor to:

subsequent to said indication, for a predetermined time period, await a deallocation of a data storage drive and demount of any portable data storage cartridge at said deallocated data storage drive; and if during said predetermined time period said deallocation occurs, allocate said deallocated data storage drive to said request; else, subsequent to expiration of said time period, allocate said spare data storage drive to said request; and, upon said allocation of a data storage drive to said request, indicate to said library to release said hold of said mount relative to said request.

30. The computer program product of claim 28, wherein said library comprises a plurality of virtual libraries responsive to said at least one request for a data storage drive, for allocating data storage drives of said automated data storage library to said plurality of virtual libraries, at least one of said plurality of virtual libraries having a higher priority than other of said virtual libraries, wherein said computer program product additionally comprises computer readable program code which causes a computer processor to determine said priority of said virtual library of said request for a data storage drive, and, only if said virtual library is of said higher priority, allocate said spare data storage drive to said request, and indicate to said library to release said hold of said mount relative to said request.

31. The computer program product of claim 28, additionally comprising computer readable program code which causes a computer processor to:

increment a count each instance said request is received when all of said data storage drives of said pool are allocated;

compare said incremented count to a predetermined limit, and, upon said incremented count being less than said predetermined limit, allocate said spare data storage drive and reset said incremented count.

32. The computer program product of claim 28, additionally comprising computer readable program code which causes a computer processor to, subsequent to said allocation of said spare data storage drive, post a message indicating use of said spare data storage drive.

33. The computer program product of claim 32, wherein said posted message comprises a notification to a system operator that action may be taken to transfer at least one said spare data storage drive to said pool.

34. The computer program product of claim 33, additionally comprising computer readable program code which causes a computer processor to:

respond to a request to transfer at least one spare data storage drive to said pool, adding at least one said spare data storage drive to said pool, deleting said data storage drive as a spare data storage drive.

35. The computer program product of claim 34, additionally comprising computer readable program code which causes a computer processor to incorporate in said posted message a notification that failure to transfer said data storage drive to said pool will result in future unavailability of spare data storage drives, and wherein said computer program product additionally comprises computer readable program code which causes a computer processor to, upon absence of a request to transfer at least one spare data storage drive to said pool, delete said assignment of at least one of said plurality of library data storage drives as spare data storage drives, such that said assigned spare data storage drives become unassigned.

36. The computer program product of claim 25, additionally comprising computer readable program code which causes a computer processor to, upon indicating said hold, to additionally indicate that a fake response is to be provided in response to said mount.

37. An automated data storage library, coupled to at least one host application, comprising:

a plurality of data storage drives;

a plurality of storage shelves for storing a plurality of portable data storage cartridges;

an accessor robot for transporting said portable data storage cartridges between said storage shelves and said data storage drives;

a robot control for operating said accessor robot; and a drive resource provider coupled to said robot control, assigning a plurality of said library data storage drives to a pool, and allocating and deallocating said data storage drives from said pool; to a plurality of virtual storage drives said drive resource provider, upon receiving a request for a data storage drive when all of said data storage drives of said pool are allocated, to the virtual storage drives indicating to said robot control to hold any mount of a portable data storage cartridge relative to said request.

38. The automated data storage library of claim 37, additionally comprising a drive image provider coupled to said drive resource provider, which, upon receiving said request for a data storage drive when all of said data storage drives of said pool are allocated, indicating that said requested data storage drive is currently unavailable to complete any subsequent command requiring a mounted portable data storage cartridge.

39. The automated data storage library of claim 37, wherein said drive resource provider additionally, subsequent to said indication, awaits a deallocation of a data storage drive and demount of any portable data storage cartridge at said deallocated data storage drive, allocates said deallocated data storage drive to said request, and indicates to said robot control to release said hold of said mount relative to said request.

40. The automated data storage library of claim 37, wherein said drive resource provider additionally assigns at least one of said plurality of library data storage drives as spare data storage drives, outside of said pool, and, subsequent to said indication, allocates one of said at least one spare data storage drives to said request, and indicating to said robot control to release said hold of said mount relative to said request.

41. The automated data storage library of claim 40, wherein said drive resource provider, subsequent to said indication, waits a predetermined time period, and awaits a deallocation of a data storage drive and demount of any portable data storage cartridge at said deallocated data storage drive; and, if during said predetermined time period said deallocation occurs, allocates said deallocated data storage drive to said request; else, subsequent to expiration of said time period, allocates said spare data storage drive to said request; and, upon said allocation of a data storage drive to said request, indicates to said robot control to release said hold of said mount relative to said request.

42. The automated data storage library of claim 40, additionally comprising a plurality of virtual libraries responsive to said at least one request for a data storage drive, said library allocating data storage drives of said automated data storage library to said plurality of virtual libraries, at least one of said plurality of virtual libraries having a higher priority than other of said virtual libraries; and wherein said drive resource provider additionally determines said priority of said virtual library of said request for a data storage drive, and, only if said virtual library is of said higher priority, allocates said spare data storage drive to said request, and indicates to said robot control to release said hold of said mount relative to said request.

43. The automated data storage library of claim 40, wherein said drive resource provider additionally increments a count each instance said request is received when all of said data storage drives of said pool are allocated, compares said incremented count to a predetermined limit, and, upon said incremented count being less than said predetermined limit, allocating said spare data storage drive.

44. The automated data storage library of claim 40, wherein said drive resource provider additionally, subsequent to said allocation of said spare data storage drive, posts a message indicating use of said spare data storage drive.

45. The automated data storage library of claim 44, wherein said drive resource provider posted message comprises a notification to a system operator that action may be taken to transfer at least one said spare data storage drive to said pool.

46. The automated data storage library of claim 45, wherein said drive resource provider additionally responds to a request to transfer at least one spare data storage drive to said pool, adds at least one said spare data storage drive to said pool, deleting said data storage drive as a spare data storage drive.

47. The automated data storage library of claim 46, wherein said drive resource provider posted message additionally comprises a notification that failure to transfer said data storage drive to said pool will result in future unavailability of spare data storage drives, and wherein said drive resource provider, upon absence of a request to transfer at least one spare data storage drive to said pool, deletes said assignment of at least one of said plurality of library data storage drives as spare data storage drives, such that said assigned spare data storage drives become unassigned.

48. The automated data storage library of claim 37, wherein said drive resource provider additionally indicates that a fake completion response is to be provided in response to said mount.

* * * * *

UNITED STATES PATENT AND TRADEMARK OFFICE
CERTIFICATE OF CORRECTION

PATENT NO. : 6,636,778 B2
DATED : October 21, 2003
INVENTOR(S) : Basham et al.

It is certified that error appears in the above-identified patent and that said Letters Patent is hereby corrected as shown below:

<u>Column 17,</u>
Lines 46-47, change "; to a plurality of virtual storage drives" to -- to a plurality of virtual storage drives; --
Line 50, change ", to the virtual storage drives" to -- to the virtual storage drives, --

<u>Column 19,</u>
Lines 12-13, change ", to the virtual storage drives" to -- to the virtual storage drives, --

<u>Column 20,</u>
Lines 49-50, change "; to a plurality of virtual storage drives" to -- to a plurality of virtual storage drives; --

Signed and Sealed this

Sixteenth Day of December, 2003

JAMES E. ROGAN
*Director of the United States Patent and Trademark Office*